United States Patent [19]
Holland et al.

[11] Patent Number: 6,086,199
[45] Date of Patent: Jul. 11, 2000

[54] EYEWEAR WITH REMOVABLE LENSES AND METHOD OF REMOVABLY MOUNTING LENSES IN EYEWEAR

[75] Inventors: John G. Holland, San Francisco, Calif.; James C. Meschter; Christopher Page, both of Portland, Oreg.; Keith S. Willows, Seattle, Wash.

[73] Assignee: Nike, Inc., Beaverton, Oreg.

[21] Appl. No.: 09/261,917

[22] Filed: Mar. 3, 1999

[51] Int. Cl.[7] ........................................... G02C 1/00
[52] U.S. Cl. .................. 351/86; 351/83; 351/41
[58] Field of Search ............................... 351/86, 83, 92, 351/90, 103, 106, 41

[56] References Cited

U.S. PATENT DOCUMENTS

| | | |
|---|---|---|
| 4,187,006 | 2/1980 | Neidell . |
| 4,217,037 | 8/1980 | Lemelson . |
| 4,602,856 | 7/1986 | Marks . |
| 4,715,702 | 12/1987 | Dillon . |
| 5,144,344 | 9/1992 | Takahashi et al. . |
| 5,187,502 | 2/1993 | Howell . |
| 5,264,875 | 11/1993 | Cooper . |
| 5,300,963 | 4/1994 | Tanaka . |
| 5,321,442 | 6/1994 | Albanese . |
| 5,402,189 | 3/1995 | Gill . |
| 5,602,603 | 2/1997 | Bondet ...................................... 351/41 |

*Primary Examiner*—Hung Xuan Dang
*Attorney, Agent, or Firm*—Klarquist Sparkman Campbell Leigh & Whinston, LLP

[57] ABSTRACT

Eyewear having easily removable lenses is provided with a frame that defines a first lens receiving recess on one side of a lens opening and a second lens receiving recess on a second side of the lens opening. Each lens has a first tab portion which corresponds with the first recess and a second tab portion which corresponds to the second recess and is mounted by placing the first tab portion in the first recess and the second tab portion in the second recess. Engagement between the respective tab portions and recesses maintains the lenses in the mounted position. To more securely lock each lens in position, a pivot member having a locking tab can be pivoted into a locking position in which the locking tab engages the lens.

17 Claims, 4 Drawing Sheets

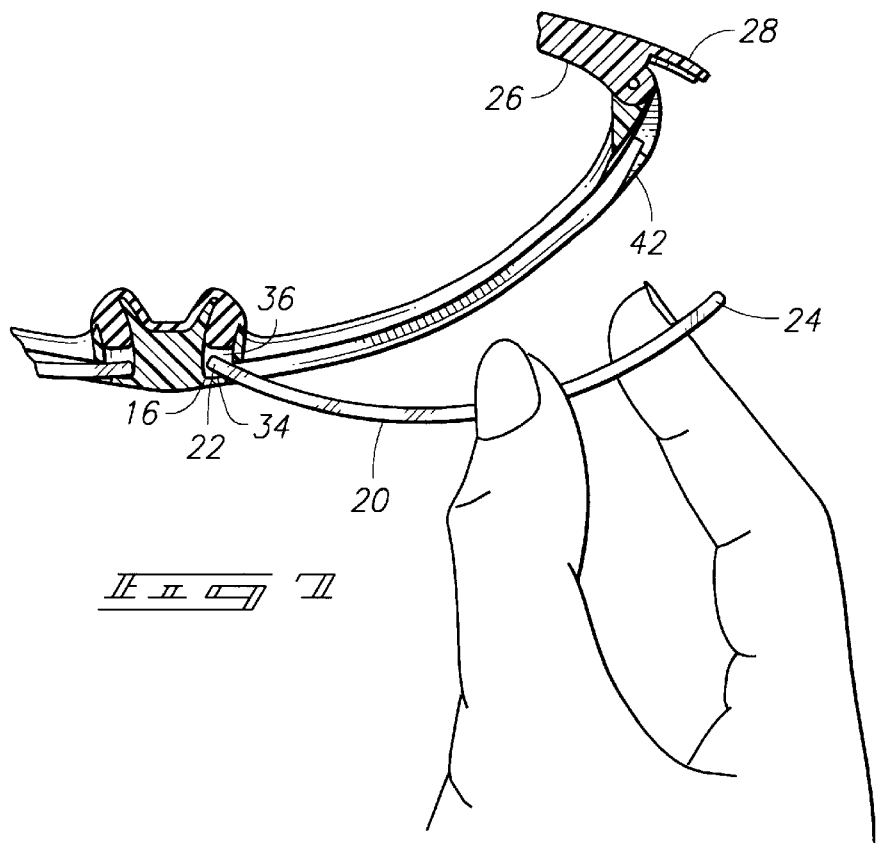
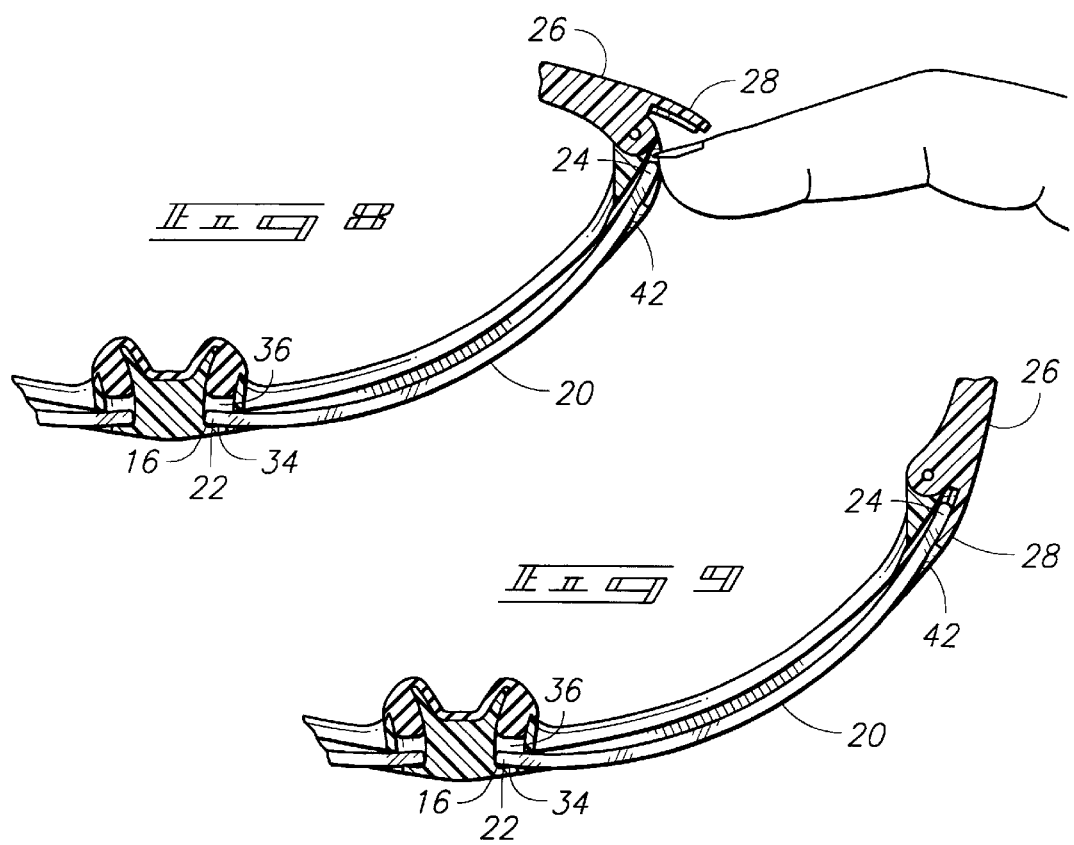

EYEWEAR WITH REMOVABLE LENSES AND METHOD OF REMOVABLY MOUNTING LENSES IN EYEWEAR

FIELD OF THE INVENTION

The present invention relates to eyewear, and more particularly to eyewear having lenses that are quickly and easily removable and to a method of removably mounting lenses in eyewear.

BACKGROUND OF THE INVENTION

Eyewear is commonly worn for a variety of reasons. As a result, a variety of eyewear types, each specifically designed and intended for a particular use or a particular environment has been developed. For example, sunglasses are often worn to protect a wearer's eyes from undesirably bright direct sun light. In such an environment, the undesirable light typically comes from above the user. Sunglasses also may be worn for protection in environments, such as around snow or water, where an uncomfortable amount of glare is present. In the instance of glare, the undesirable light often comes from below the user. For this reason, a lens having characteristics that are well suited for protecting a wearer's eyes from direct sun light, may be less effective at protecting a wearer's eyes from glare. As a result, a variety of eyewear lenses, having different characteristics and providing different advantages, have been developed. To gain the advantages of various types of lenses has, in the past, required a wearer to have multiple articles of eyewear—each having lenses of one of the various types.

Eyewear is also worn as a fashion accessory. For many wearers the color or tint of the eyewear may be an important factor in determining the suitability of the eyewear as an accessory. Moreover, the desired color or tint may vary depending on the circumstances and the items with which the wearer desires to coordinate. Again, wearers, in the past, were required to have different articles of eyewear in order to provide a selection of lenses having different colors or tints to coordinate with different fashions.

Accordingly, it would be advantageous if the lenses in an article of eyewear could be changed to allow the same eyewear to be used in different situations. For interchangeable lenses to be widely accepted, users must be able to remove and replace lenses quickly and easily.

However, eyewear lenses are typically mounted in a manner that prevents them from being quickly and easily removed from the frame. For example, in one type of eyewear, the portion of the frame that defines the lens opening is provided with a small gap. The gap is spanned by a threaded screw which can be tightened to decrease the size of the gap and, hence, the size of the lens opening. The lens is positioned within the lens opening and the screw is tightened to clamp the lens within the opening. In eyewear of this type, removal of the lens requires tools and is not typically performed by the wearer. Typically, removal also requires direct contact with the front and rear faces of the lens and, as a result, may scratch, dirty or mar the lens.

In some eyewear, the internal perimeter of the lens opening is provided with a groove into which the edge of the lens is engaged. In some eyewear of this type, the edge of the lens is received within the groove. Alternatively, the perimeter of the lens may have a raised rib which is received within the groove. Again, however, in this type of eyewear the lenses are not intended to be removed by a user.

In other eyewear, the frame is provided with a metal rim so that lenses having magnets about their periphery may be removably attached. Although this system allows a wearer to remove and interchange lenses, the presence of magnets on the lens may detract from the quality and appearance of the lens. Such a system also does not provide a sure mechanical connection of the lens to the frame. Moreover, such a system is not designed to reduce the possibility of a wearer handling the faces of the lens during the process of removing or interchanging the lenses. This increases the possibility of the front and rear faces of the lens being dirtied or damaged.

Clip-on lens covers are also available for eyewear. Such covers often include a tinted lens cover and are suited to be clipped onto prescription eyewear to convert them into prescription sunglasses. In many cases, the clip-on lens cover can be flipped up so that the wearer looks through the untinted prescription lenses or, alternatively, flipped down so that the wearer looks through both the prescription lenses and the tinted lens covers.

SUMMARY OF THE INVENTION

Accordingly, it is an object of the invention to provide eyewear having lenses that are securely held in place within an item of eyewear, but which can be easily and quickly removed by a wearer.

It is a further object of the invention to provide a method for removing and removably mounting lenses to the frame with minimal need to handle or touch the faces of the lenses.

In accordance with these and other objects of the invention, eyewear in accordance with a preferred embodiment of the present invention has a frame which defines a least one opening. A first lens receiving recess is on one side of the opening and a second lens receiving recess is on a second side of the opening. A lens is provided that has a first tab portion and a second tab portion. The first tab portion is removably received within the first recess and the second tab portion is removably received within the second recess to removably hold the lens in position. In the illustrated embodiment, the first and second tab portions are integrally formed as part of the overall lens shape. However, this need not be the case.

In one aspect of the invention, a pivot member is attached to the frame. The pivot member can be moved into a position in which it firmly locks the lens in place. In a preferred embodiment, the pivot member is provided with a locking tab and the second lens receiving recess is provided with a cooperating gap. In this manner, the locking tab is received within the gap and engages the second tab portion to lock the lens in place. In certain embodiments, when the pivot member is not in the locking position, the gap also allows access to the second tab portion to facilitate the easy mounting and removal of the lens. In particular, a groove may be provided to allow a wearer to insert a finger or fingernail under the second tab portion to easily remove the lens.

In another aspect of the invention, the only portions of the lens to engage the frame are the first tab portion and the second tab portion. The remainder of the lens may be spaced from the frame to facilitate, for example, air circulation around the lens to reduce fogging.

A lens in accordance with certain aspects of this invention is removably mounted to the frame by placing the first tab portion into the first lens receiving recess and placing the second tab portion into the second lens receiving recess. The pivot member can then be moved to the locking position to secure the lens in position. To remove the lens, the pivot member is moved out of the locking position, the second tab portion is removed from the second lens receiving recess and the first tab portion is removed from the first lens receiving recess. In the illustrated embodiment, both the mounting and removal of the lens can be done by holding only the edges and tab portions of the lens. Thus, the likelihood of damaging or scratching the faces of the lens is reduced.

Other objects and aspects of the invention will become apparent to those skilled in the art from the detailed description of the preferred embodiment which is presented by way of example and not a limitation of the present invention.

BRIEF DESCRIPTION OF THE DRAWINGS

FIG. 7 is a top cross-sectional view of a portion of the eyewear of FIG. 1, showing the lens only partially mounted (the lens is not shown in cross-section).

FIG. 8 is a top cross-sectional view of a portion of the eyewear of FIG. 1, showing the lens mounted with the pivot member in the closed, or unlocked, position (the lens is not shown in cross-section).

FIG. 9 is a top cross-sectional view of a portion of the eyewear of FIG. 1, showing the lens mounted and the pivot member in the locked position (the lens is not shown in cross-section).

DETAILED DESCRIPTION OF THE ILLUSTRATED EMBODIMENTS

Figure 1:
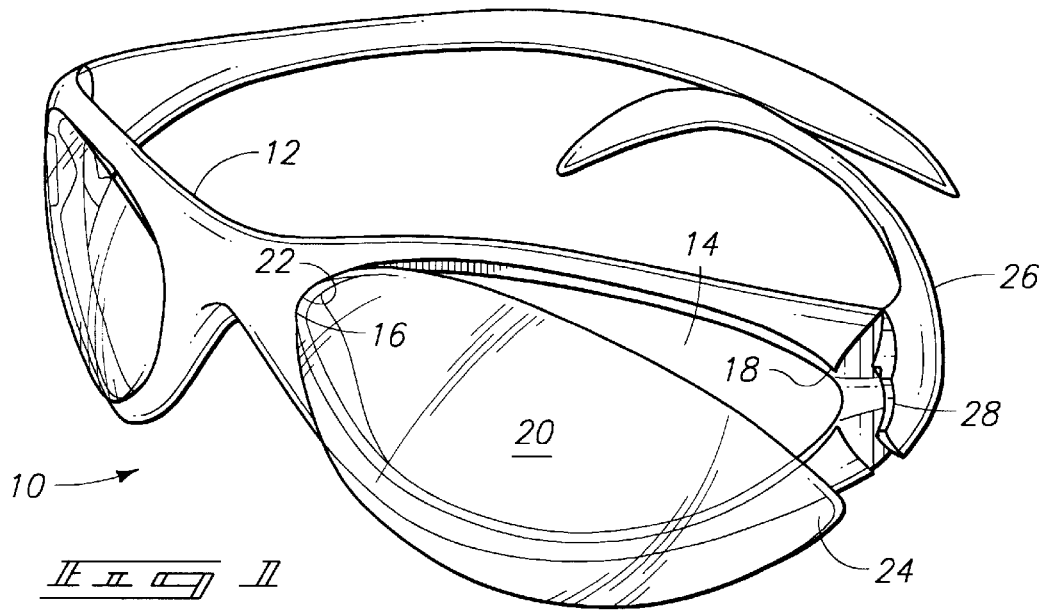
FIG. 1 is a perspective view of an article of eyewear in accordance with a preferred embodiment of the present invention, showing the left lens in a partially mounted position.
Figures 2, 4:
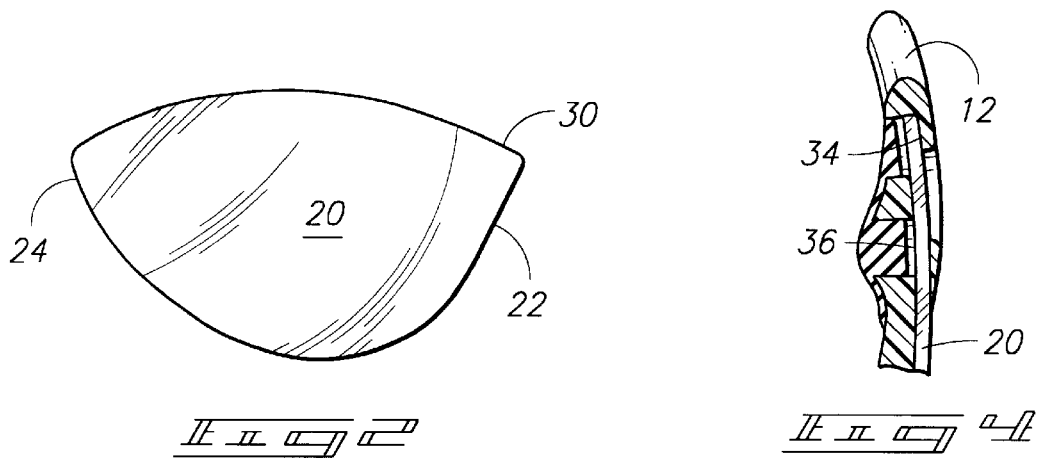
FIG. 2 is a front view of a lens from the eyewear of FIG. 1.
FIG. 4 is a cross-sectional view taken along line 4—4 in FIG. 3.

An article of eyewear 10 in accordance with a preferred embodiment of the present invention is shown in FIG. 1. The eyewear 10 includes a frame 12 that defines two lens openings 14. Each lens opening 14 has a medial lens receiving recess 16 and a lateral lens receiving recess 18. A lens 20 can be removably mounted within each lens opening 14. Each lens 20 (the right hand lens is illustrated separately in FIG. 2) has a medial tab portion 22 and a lateral tab portion 24. To mount the lens, the medial tab potion 22 is placed into the medial recess 16 and the lateral tab portion 24 is placed within the lateral recess 18. In this manner, each lens is held in position by reason of the engagement between the tab portions on the lenses and the corresponding recesses on the frame. The lenses may be removed and changed, by reversing the process. This allows a wide variety of lenses to be selectively mounted to a single article of eyewear and greatly increases the functionality and versatility of that eyewear.

The illustrated embodiment also provides a positive manner of securely locking each lens in the mounted position. This is accomplished by means of a pivot member 26, having a locking tab 28, associated with each lens opening 14. As illustrated in FIG. 1, the pivot members 18 are attached to the frame 12 and are moveable between a closed position and a locked position. In FIG. 1, only the right-hand pivot member is shown in the locked position. (Unless noted otherwise, references to right-hand and left-hand sides are from the perspective of a wearer of the illustrated eyewear.) In the locked position, the locking tab 28 engages the lateral tab portion 24 to securely hold the lens in the mounted position.

Figure 3:
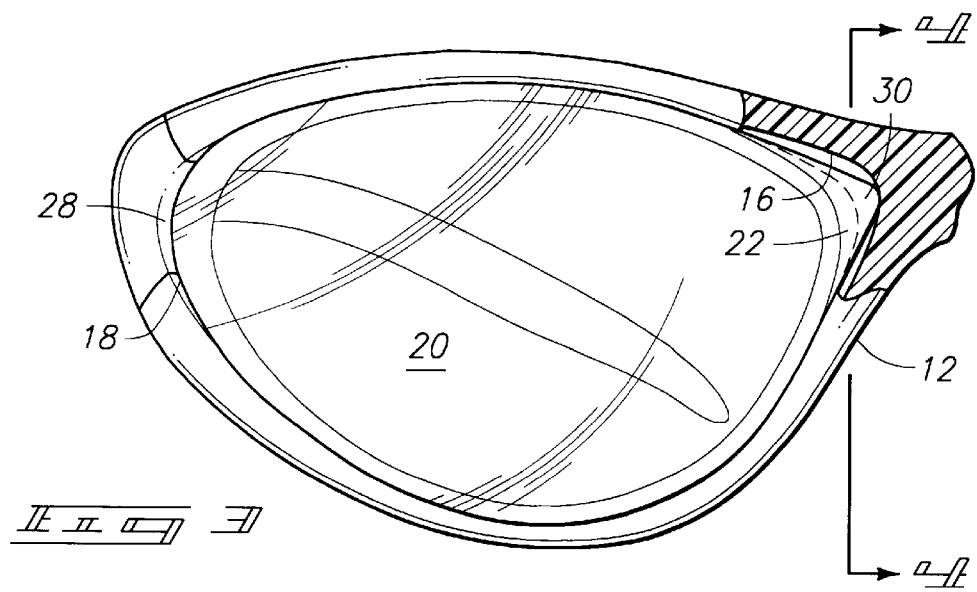
FIG. 3 is a partially cut-away, front view of the eyewear of FIG. 1.

The illustrated frame 12, seen best in FIGS. 1 and 3, can be of virtually any desired shape and configuration. Similarly, the lens openings 14 may also have a variety of shapes to accommodate a variety of lens shapes. In the illustrated embodiment, the frame 12 completely encloses each lens opening. However, it should be understood that the lens opening need not be completely enclosed. For example, the bottom of the lens opening may be open. In the illustrated embodiment, the frame defines two lens receiving recesses for each lens opening—one on the medial side of the lens opening and one on the lateral side of the lens opening. Having the recesses on generally opposing sides of the lens opening provides for a more secure mounting of the lens to the frame. Similarly, having a recess on the lateral side of the lens opening facilitates the illustrated locking mechanism and allows the pivot member to serve as an ear piece. However, the recesses need not be directly opposite from one another and can be located in many places about the periphery of the lens opening. For example, one recess could be positioned on the top of the lens opening and the other on the bottom or even on one side.

Each lens receiving recess is shaped to receive the corresponding tab formed on the lens. In the illustrated embodiment, the medial tab portion 22 comes to a slightly rounded point 30, seen best in FIG. 2. As seen in FIG. 3, this point 30 is received within the medial recess 22. The upper and lower boundaries of the recess serve to limit up and down motion of the point within the recess. Similarly, the rear wall 32 and front wall 34 (seen best in FIG. 4) sandwich the point 30 and limit forward or backward movement of the tab within the recess. The recess is also provided with a cavity (seen best in FIGS. 7–9) which allows the point to pivot somewhat within the recess. As explained in more detail below, this pivoting facilitates the mounting and removal of the lens from the frame.

Figure 5:
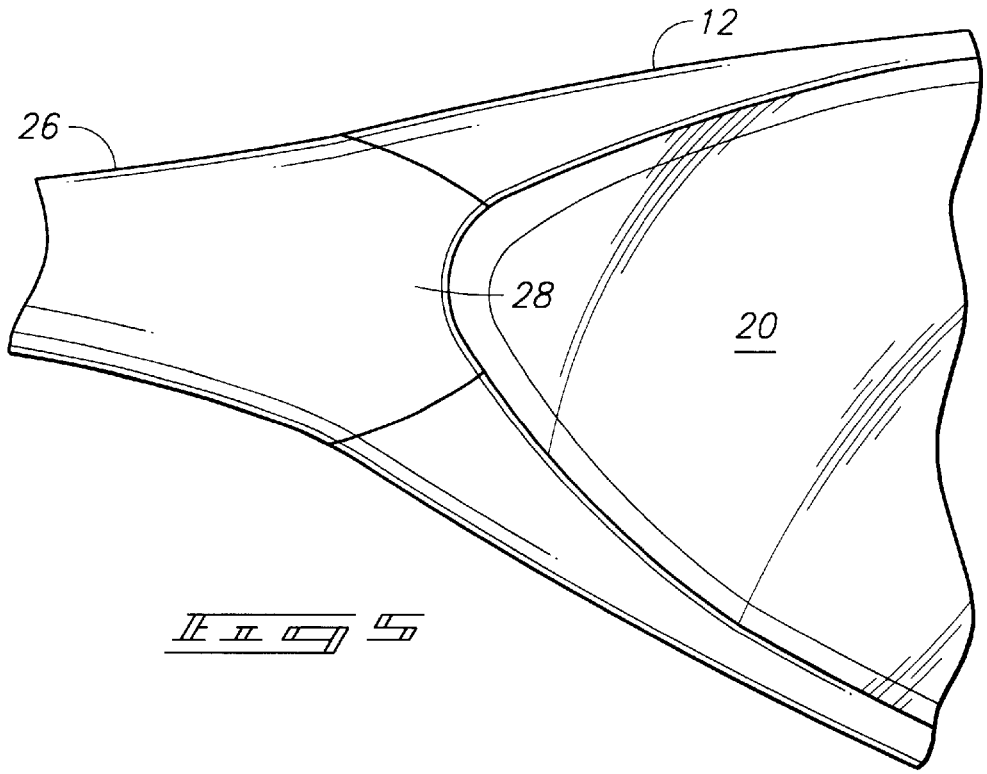
FIG. 5 is a side view of a portion of the eyewear of FIG. 1.
Figure 6:
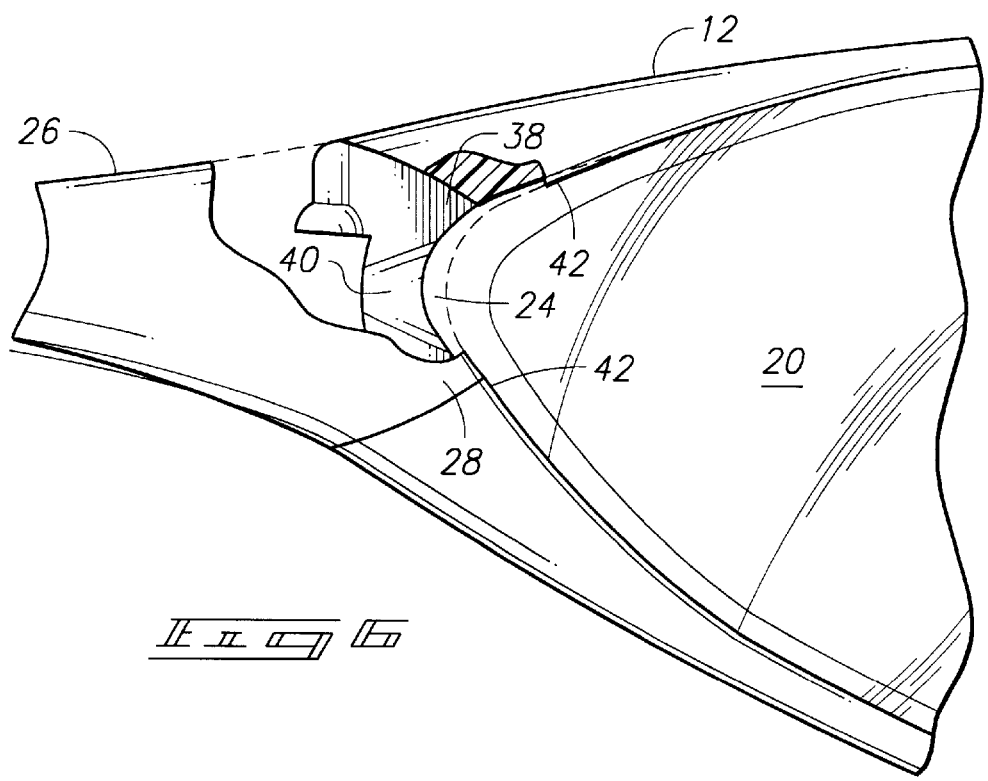
FIG. 6 is a partially cutaway view of FIG. 5.

The lateral tab portion 24 is received within the lateral recess 18 in a similar manner, illustrated best in FIGS. 5, 6 and 9. In the illustrated embodiment, however, a gap 38 is provided in the front wall of the lateral recess 18. (The gap is seen best in FIG. 1.) This gap cooperates with the pivot member to positively lock the lens firmly in position and also facilitates easy removal of the lens from the frame. In particular, the locking tab 28 fits within the gap 38 and engages the front face of the lens as shown in FIGS. 5, 6 and 9 to securely maintain the lens in position. The lateral recess is also provided with a finger groove 40 which allows a wearer's finger or fingernail to engage the lateral tab portion to insert or remove the lens. In the illustrated embodiment, the finger groove is accessible only when the pivot member is not in the locked position.

In the illustrated embodiment, the pivot member is hinged to the frame and the end opposite the locking tab 28 extends generally rearward to engage the head of a wearer. In this manner, the illustrated pivot member also serves as an ear piece for the eyewear. While this design is particularly advantageous and efficient, in other embodiments, the pivot member may be separate from the ear piece and may pivot in a different manner.

The process of mounting a lens is illustrated in FIGS. 7–9. Initially, a wearer grasps the lens 20 firmly by the upper and lower edges and inserts the medial tab portion 22 into the medial recess 16. As shown in FIG. 7, the cavity 36 accommodates the point 30 while the lens is in this pivoted position. Still holding only the edges of the lens, the wearer pivots the lens toward the frame and, by placing a finger or fingernail on the end of the lateral tab portion 24, places the lateral tab portion 24 within the lateral recess 18, as shown in FIG. 8. The gap 38 and the finger groove 40 accommodate the wearer's finger during this step of the mounting procedure. As seen best in FIG. 6, the front wall of the lateral recess slightly overhangs the lateral tab both above and below the gap. The lens is maintained in this position by the engagement of this overhang 42 with the lateral tab portion. In order to insert the lateral tab portion under the overhang, a slight amount of pressure on the end of the lateral tab portion is applied. This pressure causes the lens, the frame, or both to flex slightly so that the tab can be placed under the overhang. When the pressure is released, the flexed lens, frame or both return to normal so that the overhang engages the lateral tab portion.

Once in the mounted position, shown in FIG. 8, the lens can be locked firmly in place by pivoting the pivot member 26 to the locked position, shown in FIGS. 5, 6 and 9. In the locked position, the locking tab 28 overlaps with the lateral tab portion 22 sufficiently to hold the lens securely in place.

The lens can be simply and quickly removed by reversing these steps: pivot the pivot member out of the locked position; engage the end of the lateral tab portion with a finger or fingernail; apply pressure to flex the lens, frame or both; pivot the lateral side of the lens outward from the frame; grasp the upper and lower edges of the lens securely; and withdraw the medial tab portion from the medial recess.

As can be appreciated from this description, the mounting and removal of a lens is simple and fast. Moreover, it can be accomplished without the need to touch the faces of the lens. This serves to allow a wearer the advantages of removable lenses and while reducing the possibility of damage to the lenses.

Figure 10:
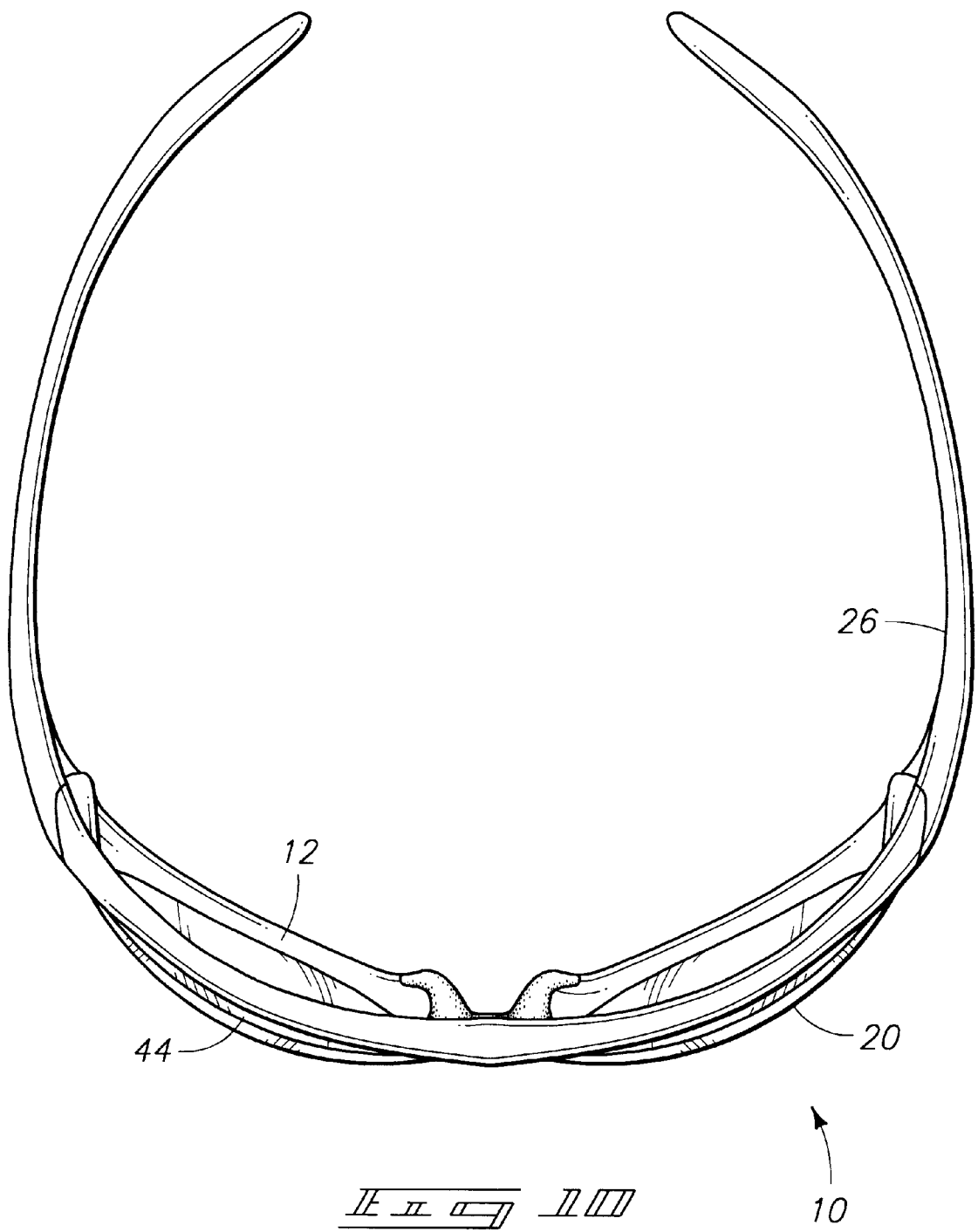
FIG. 10 is a top view of an article of eyewear in accordance with an alternative embodiment of the present invention.

From the foregoing, it is clear that the engagement of the medial tab portion with the medial recess and the lateral tab portion with the lateral recess are sufficient to hold the lens in position, particularly with the pivot member in the locking position. As a result, there is no need for any other portions of the lens to engage the frame. Nonetheless, in the embodiment illustrated in FIGS. 1–9, the entire lens fits within the lens opening and may be in contact with the frame. This allows the front face of the lens to be flush with the front of the frame to create a smooth, sleek appearance. However, since the engagement of the tab portions with the recesses is sufficient to hold the lens in place, the remainder of the lens may float forwardly of the frame, as seen in the alternative embodiment illustrated in FIG. 10, to create a space 44 between the lens and the frame. This space increases the flow of air around the lens and helps to reduce fogging.

It should also be appreciated that this invention can be implemented using a wide variety of shapes and materials. In the illustrated embodiment, the lenses are made of polycarbonate, and the frames are made of nylon. These materials provide the necessary flex to allow easy mounting and removal of the lens. However, those skilled in the art will recognize that a number of other materials—such as glass, CR 39 or any other suitable non-opaque material for the lenses, or plastic or metal for the frames—could also be used and still provide the desired flex. Further, it is not necessary that both the lens and the frame flex. Rather, so long as one or the other flex sufficiently to allow the mounting and removal of the lens, the advantages of the described eyewear are obtained. In the illustrated embodiment, the pivot member is made of the same material as the frame. Again, however, those skilled in the art will recognize that a wide variety of materials, either alone or in combination may be used in the described eyewear.

Although only eyewear having two lens openings and two lenses is shown and described above, an alternative embodiment might have a single lens which extends from the left lateral side, completely across a wearer's face, to the right lateral side. The use of recesses and cooperating tab portions, as shown above, could be readily adapted to allow such a lens to be quickly and easily mounted and removed. Moreover, although each illustrated lens has only two tab portions, in alternative embodiments it may be desirable to use more than two sets of cooperative recesses and tab portions per lens.

This detailed description is set forth only for purposes of illustrating examples of the present invention and should not be considered to limit the scope thereof in any way. Clearly, numerous additions, substitutions, and other modifications can be made to the invention without departing from the scope of the invention which is defined in the appended claims and equivalents thereof.

What is claimed is:

1. Eyewear comprising:
    a frame defining at least one opening, the frame having a first lens receiving recess on a first side of the opening and a second lens receiving recess on a second side of the opening;
    a lens having a front face, a back face, a first tab portion and a second tab portion, the first tab portion positioned to be removably received within the first lens receiving recess and the second tab portion positioned to be removably received within the second lens receiving recess to removably hold the lens in position; and
    a pivot member having a locking tab, the pivot member being movable between a first position and a locked position in which the locking tab cooperates with the second recess to lock the lens in position.

2. The eyewear of claim 1 in which the second lens receiving recess is provided with a gap, the gap allowing access to the second tab portion to facilitate mounting and removal of the lens, the locking tab being positioned within the gap to lock the lens in position when the pivot member is in the locked position.

3. The eyewear of claim 2 in which the gap is further provided with a groove for providing access to the second tab portion.

4. The eyewear of claim 2 in which the lens engages the frame only at the first tab portion and the second tab portion.

5. The eyewear of claim 4 in which the back face of the lens is spaced forwardly from the frame except at the first tab portion and the second tab portion.

6. The eyewear of claim 2 in which the frame encloses the opening.

7. The eyewear of claim 2 in which the pivot member is hingedly connected to the frame.

8. The eyewear of claim 7 in which the pivot member comprises an ear piece to engage the head of a wearer when in the locked position.

9. Eyewear comprising:
    a frame defining at least one opening, the opening having a first lens receiving recess on a first portion of the opening and a second lens receiving recess on the second portion of the opening, the first portion being located on an opposing side of the opening from the second portion, the second lens receiving opening having a gap;

a lens having a front face, a back face, a first tab portion and a second tab portion, the first tab portion positioned to removably fit within the first lens receiving recess and the second tab portion positioned to removably fit within the second lens receiving recess to removably hold the lens in position;

a pivot member hingedly attached to the frame and movable between a first position and a locked position, the pivot member having a locking tab which fits within the gap and engages the second tab portion to lock lens in position when the pivot member is in the locked position, the pivot member also adapted to engage the head of a wearer when in the locked position.

10. The eyewear of claim 9 in which the pivot member comprises an ear piece.

11. The eyewear of claim 9 in which the gap is further provided with a groove for providing access to the second tab portion.

12. The eyewear of claim 9 in which the lens engages the frame only at the first tab portion and the second tab portion.

13. The eyewear of claim 12 in which the back face of the lens is spaced forwardly from the frame except at the first tab portion and the second tab portion.

14. A method of removably mounting an eyewear lens, comprising the steps of:

providing a frame defining at least one opening, the opening having a first lens receiving recess on a first portion of the opening and a second lens receiving recess on the second portion of the opening;

providing a lens having a front face, a back face, a first tab portion and a second tab portion;

placing the first tab portion within the first lens receiving opening;

placing the second tab portion with the second lens receiving opening;

providing a pivot member attached to the frame and having a locking tab, the pivot member being movable between a first position and a locked position in which the locking tab engages the lens to lock it in position; and moving the pivot member to the locked position.

15. The method of claim 14 in which the second lens receiving recess has a gap and the locking tab fits within the gap and engages the second tab portion when in the locked position.

16. The method of claim 15 in which the lens engages the frame only at the first tab portion and the second tab portion.

17. The eyewear of claim 16 in which the back face of the lens is spaced forwardly from the frame except at the first tab portion and the second tab portion.

* * * * *